United States Patent [19]
Briggs

[11] 3,875,747
[45] Apr. 8, 1975

[54] HYDRAULIC CONTROL CIRCUITS

[75] Inventor: Kenneth Edward Briggs, Leighton Buzzard, England

[73] Assignee: Lancer Boss Limited, Buzzard, Bedfordshire, England

[22] Filed: Apr. 5, 1973

[21] Appl. No.: 348,000

[30] Foreign Application Priority Data
Apr. 14, 1972 United Kingdom............... 17337/72

[52] U.S. Cl. ...................... 60/420; 60/422; 60/423; 60/DIG. 2
[51] Int. Cl. ........................................... F15b 11/16
[58] Field of Search .......... 60/420, 422, 423, DIG. 2; 137/101; 91/112

[56] References Cited
UNITED STATES PATENTS

| | | | |
|---|---|---|---|
| 2,330,739 | 9/1943 | Piron | 60/DIG. 2 |
| 2,674,092 | 4/1954 | Gardiner | 60/422 X |
| 2,737,196 | 3/1956 | Eames | 60/422 X |
| 3,543,516 | 12/1970 | Treichel | 60/422 X |
| 3,579,987 | 5/1971 | Busse | 60/422 X |

Primary Examiner—Edgar W. Geoghegan
Attorney, Agent, or Firm—Karl W. Flocks

[57] ABSTRACT

A hydraulic control circuit for a self propelled lifting truck e.g. a fork lift truck has a reservoir for hydraulic fluid, a first supply circuit fed by the reservoir for supplying hydraulic fluid to lifting and tilting cylinders on the truck and a steering supply circuit also fed by the reservoir for supplying hydraulic fluid to power assisted steering means for the truck, and a pump for pumping fluid around both the circuits. Valve means are actuable by an operator to control the flow of fluid to the lifting and tilting cylinders, and a control unit is provided for the pump to vary the output of the pump in response to operation of the valve means, the steering supply circuit including metering means for maintaining a continuous metered flow of fluid in the steering supply circuit whilst the pump is in operation.

5 Claims, 2 Drawing Figures

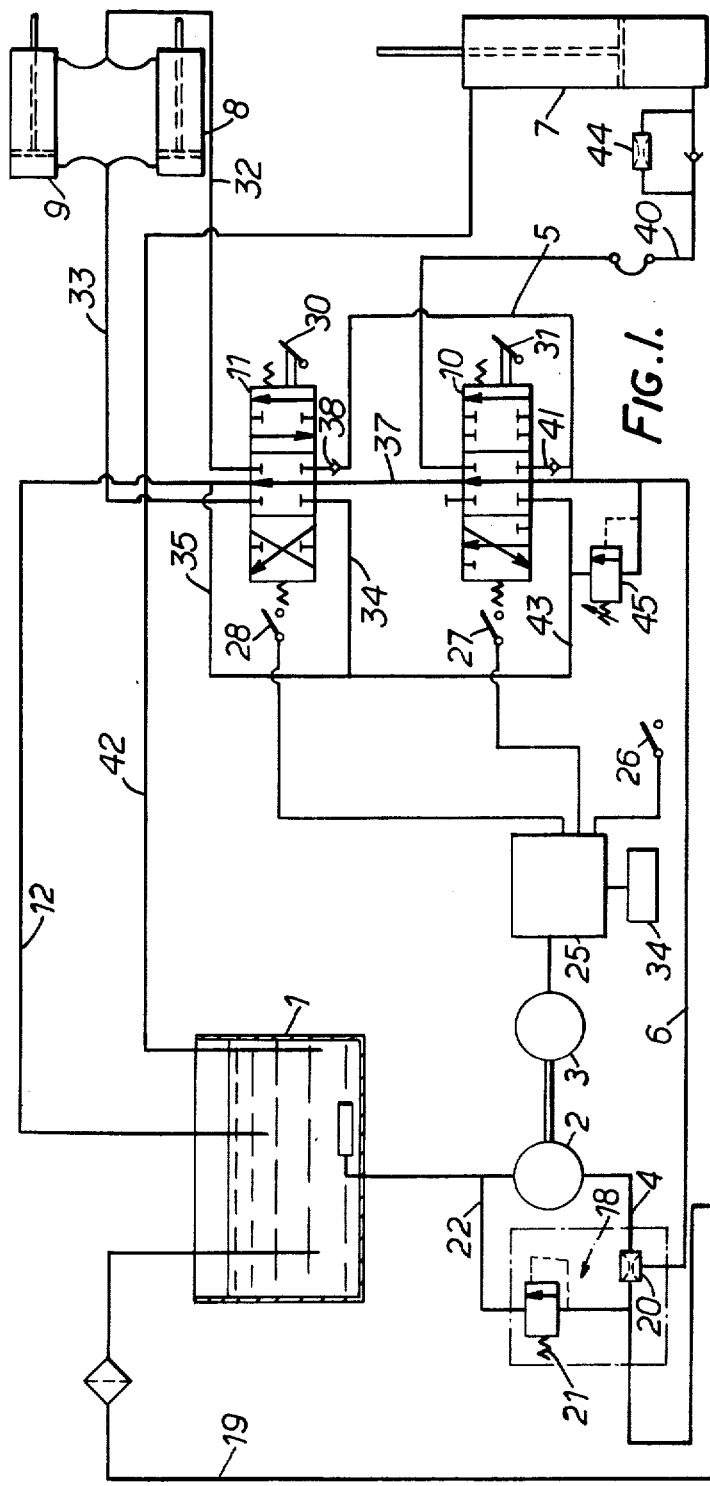
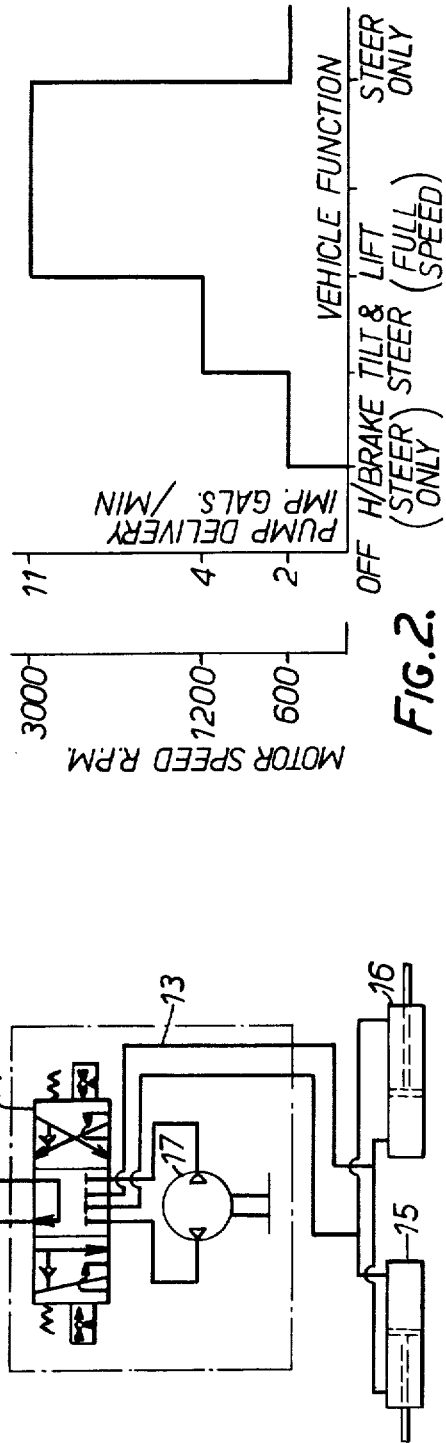

HYDRAULIC CONTROL CIRCUITS

BACKGROUND OF THE INVENTION

1. Field of the Invention

This invention relates to hydraulic control circuits for self-propelled lifting and carrying vehicles such as fork lift trucks.

2. Description of the Prior Art

The main functions that a lifting and carrying vehicle such as a fork lift truck generally perform are driving, steering, lifting of the forks and tilting of the lifting mast. The lifting and tilting functions are carried out by the pressure of hydraulic fluid in a circuit, which acts on hydraulic cylinders connected to the tilting mast. If power-assisted steering is fitted to the truck, this is also operated by fluid pressure in a hydraulic circuit.

Some known fork lift trucks are provided with a single motor which is used both for propelling the truck and for driving the hydraulic pump which provides power for the lifting and carrying functions of the truck. A clutch is provided for disengaging the motor from the wheels when power is required for the hydraulics. This arrangement is generally confined to trucks powered by internal commbustion engines, and although the invention may be applied to such vehicles, it is particularly applicable to electrically-operated trucks.

Electrically operated trucks are generally provided with one or more electric traction motors for driving the truck and an additional electric motor for driving the hydraulic pump. These motors draw current from a rechargeable battery mounted on the truck. As the power available from the battery is limited, it is most important to conserve as much electrical energy as possible; because of this, the motor for the hydraulic pump is usually operated only when a function is being carried out, i.e. the pump motor is activated only on operation of the tilt or lift controls.

It will be appreciated that different functions of the truck require different delivery rates from the pump; for example tilting requires only a proportion of the pump's delivery, whereas lifting will often require full power. In order therefore to avoid wastage of energy, it has been proposed to vary the delivery rate of the pump in accordance with the function being carried out; this has been done by automatically controlling the speed of the pump motor in response to the particular lift or tilt control operated. For example, if the tilt control in the truck is operated, the pump motor is started and run to a speed of 1000 r.p.m. This provides enough hydraulic power to operate the tilting mechanism. If then the lifting control is actuated, the pump motor is caused to speed up to 3,500 r.p.m. to provide the additional power required for lifting.

With this arrangement, it has not hitherto been possible to include a hydraulic steering circuit in the same circuit as the lifting and tilting circuit. It is necessary to have steering control of the truck at all times and with power assisted steering this requires the continuous operation of the pump supplying the steering circuit. Owing to the difficulties of devising a single circuit for lifting, tilting and steering, trucks fitted with power-assisted steering have hitherto required two separate hydraulic circuits, the circuit for the steering including a separate motor and pump which is run continuously. These additional components inevitably result in higher costs.

It is a main object of the present invention to provide a hydraualic hydraulic circuit for a lifting truck, in which the aforesaid disadvantages are minimised or eliminated.

SUMMARY

According to the invention, a hydraulic control circuit for a self-propelled lifting truck such as a fork lift truck has a reservoir for hydraulic fluid, a first supply circuit connected to the reservoir for supplying hydraulic fluid to lifting and tilting cylinders mounted on the truck, a second, steering supply circuit connected to the reservoir for supplying power assisted steering means on the truck, a pump for pumping fluid around both said supply circuits, valve means actuable by an operator to control the flow of fluid to the lifting and tilting cylinders, a control unit for the pump operable to vary automatically the output of the pump in response to the operation of the valve means, and metering means in the steering supply circuit for maintaining a continuous metered flow of fluid in said steering supply circuit whilst the pump is in operation.

By the provision of metering means in the steering supply circuit, a continuous measured flow of hydraulic fluid is maintained in the steering supply circuit, and when the pump is running, power-assistance for the steering is available at all times. The pump is run continuously at the minimum delivery required for operation of the steering and is only caused to increase its output when the valve means for the tilting or lifting cylinders are operated.

Preferably the metering means comprises a restrictor downstream of the pump and a relief valve downstream of the restrictor, the outlet side of the relief valve being connected into the hydraulic circuit between the pump and the reservoir. With this arrangement, the supply circuit for the lifting and tilting cylinders is connected between the pump and the restrictor.

In this way, build-up of fluid pressure in the steering circuits is prevented, and any excess fluid due for example to the pump running at full delivery, is returned upstream of the pump.

The circuit is suitably fitted with a switch controlled by an operator to stop and start the pump motor through the control unit, and this switch is advantageously operated by the handbrake of the vehicle, so that release of the handbrake activates the control unit to start the pump motor at the preset minimum level required for steering control.

A safety device may be fitted to the control unit, which device is operable to set the motor onto full power in the event of failure of a component. This ensures that an operator will have full control over the truck at all times.

BRIEF DESCRIPTION OF THE DRAWINGS

FIG. 1 is a schematic representation of a hydraulic control circuit for a forklift truck, and FIG. 2 is a graph of pump motor speed plotted against the various functions of the truck.

DESCRIPTION OF THE PREFERRED EMBODIMENT

Referring to the drawings, FIG. 1 shows a hydraulic control circuit for a fork lift truck, the circuit having a reservoir 1 for hydraulic fluid, a pump 2 for pumping the fluid from the reservoir 1 and an electric motor 3 for driving the pump 2. The pump delivers into a main supply line 4.

A supply circuit generally indicated at 5 is connected to supply line 4 by line 6 and serves to deliver hydraulic fluid from the pump 2 to a lifting cylinder 7 and two tilting cylinders 8 and 9, flow of fluid to the cylinder 7 and cylinders 8 and 9 being controlled by slide valves 10 and 11 respectively. Both valves are spring-biassed into the neutral position shown in the drawing, in which position any flow from line 6 passes through the valves back into the reservoir 1 via line 12, without passing into the lifting or tilting cylinders.

A steering supply circuit, generally indicated at 13 is connected to the pump by main supply line 4 through a steering supply valve 14; this valve 14 operates steering cylinders 15 and 16 in conventional manner in response to the steering column 17, to provide power assisted steering for the truck.

A metering unit, generally indicated at 18 is provided in the main supply line 4 between the pump and the valve 14, the metering unit serving to provide a continuous metered flow of hydraulic fluid to the steering circuit whilst the pump is in operation. This ensures continuous hydraulic power to the steering circuit.

The metering unit comprises a restrictor 20 in line 4 and a pressure relief valve 21 set in this example at 2000 p.s.i. The restrictor 20 restricts the flow of fluid in the steering circuit to the required rate, and the relief valve operates to maintain the pressure in the steering part of the circuit at the pre-set level. The pressure relief valve is connected to line 4 downstream of the restrictor and its outlet line 22 is connected between the reservoir 1 and the pump 2. Excess fluid is thereby dumped back into the circuit upstream of the pump. Flow returns to the reservoir 1 from the main part of the steering circuit via line 19.

The line 6 for the lifting and tilting circuit is joined to line 4 at the restrictor 20; the metering unit therefore acts as a preferential flow divider, the preferred flow always being into the steering circuit 13, but the major proportion of any excess flow from the pump passing into line 6.

Operation and control of the pump motor is carried out by the control unit 25 in response to signals received from switches 26, 27 and 28. Switches 27 and 28 are actuated by operation of the lift and tilt valves 10 and 11 respectively; switch 26 is associated with the handbrake of the vehicle and when the handbrake is on, no power is supplied to the motor 3. When the handbrake is released, switch 26 is closed and the control unit 25 starts up the motor 3 at a pre-set speed of, in this example, 600 r.p.m. to give a pump delivery rate of around 2 gals/min. This delivery rate is sufficient to operate the steering, and flow commences in the steering supply circuit 13. At this delivery there is substantially no flow in line 6.

When tilt lever 30 is operated to initiate tilting of the mast of the truck, slide valve 11 moves to the left of FIG. 1 to place supply line 32 leading to one side of the cylinders 8 and 9 into communication with line 5, which is connected to supply line 6. At the same time, the opposite side of cylinders 8 and 9 is placed into communication with return line 12 via lines 33, 34 and 35. Simultaneously, switch 28 is operated and the control unit 25 speeds up the motor 3 to 1,200 r.p.m. This gives a flow-rate from the motor of 4 gals/min. Due to the restrictor 20, the additional 2 gals/min passes into line 6. As the central supply line 37 between valves 10 and 11 is closed off by valve 11 in its position to the left in FIG. 1, flow passes through lines 5 and 32 and the pistons in cylinders 8 and 9 are moved to the left in FIG. 1 to tilt the truck mast. As described, return flow from the cylinders flows to the reservoir 1 via lines 33, 34, 35 and 12. Movement of the slide valve 11 to the right of FIG. 1 to initiate tilting of the mast in the opposite direction also operates the switch 28. In this case, powered flow to the cylinders 8 and 9 occurs via lines 5 and 33, and return flow takes place via lines 32, 34, 35 and 12. A check valve 38 is provided in line 5 as a safety device to prevent a reversal of flow from the tilt cylinders 8 and 9 as a result of, for example, overloading or failure of the pump motor.

On release of the tilt lever 30, the valve moves back into the position shown in the drawing and switch 28 is opened; power to the motor is thereby automatically reduced.

The operation of the lifting mechanism is similar to that described in connection with the tilt mechanism. Movement of lift lever 31 into a "lift" position causes the value 10 to slide to the left in FIG. 1 thus placing the lifting cylinder 7 in communication with the supply line 6 via lines 40 and 41. The switch 27 is closed by movement of the valve and the motor is caused to speed up by the control unit to 3000 r.p.m. to give a delivery rate of 11 gals/min. The additional flow passes into line 6 to move the piston in cylinder 7 upwards and provide sufficient power for lifting the rated load of the truck. The opposite side of the cylinder 7 empties into the reservoir via line 42. Lowering of the forks is carried out by movement of the lever 31 to the right in FIG. 1, to provide a bleed path for the fluid in cylinder 7 via restrictor 44 and lines 40 and 43. This movement cuts the additional power to the motor by opening the switch 27. If lifting and tilting is carried out simultaneously flow to the cylinders is shared. The lift and tilt circuit is protected by a pressure relief valve 45 which prevents a dangerous build-up of pressure in the circuit which might occur for example if the truck is overloaded or if a careless operator holds one of the valves 10 or 11 in a "power on" position when the piston or pistons have used up their full movement. If this occurs, the valve 45 operates and excess flow is directed to the reservoir 1 via lines 43, 35 and 12.

The pre-setting of the motor speeds is carried out by a trimming control 34 of known construction mounted on the control unit. The control unit itself may if desired be operable to set the pump onto full delivery in the event of failure of any number of selected components so that the operator maintains full control of the truck at all times.

FIG. 2 is a graph showing the speed and delivery of the motor 3 plotted against the function carried out by the circuit.

The motor is inoperative until the switch 26 is actuated by the handbrake. On release of the handbrake, the motor is started to a speed of 600 r.p.m. with a delivery of 2 gals/min. The closing of switch 28 due to operation of the tilting controls cuases the motor speed to rise to 1200 r.p.m., delivering 4 gals/min., 2 gals/min. being required to operate the tilting mechanism.

Operation of the lift controls causes a further rise to 3,000 r.p.m delivering 11 gals/min, sufficient to lift the rated load of the truck. The return of the lift and tilt controls to the neutral position causes a reduction in speed of the motor to 2 gals/min, thus maintaining steering control. The motor is switched off when the handbrake is applied.

At all times during operation the steering supply circuit remains in communication with the pump 2 thus providing continuous flow of fluid to the power assisted steering.

The electronic control system is so arranged that when the truck is stationary with the handbrake on, operation of the lift or tilt controls will cause the motor to start up from rest, to enable these functions to be carried out. The 2 gals/min, is still directed around the steering circuit as before, but as this will be in the neutral state (i.e. no steering effort applied), very little pressure will be encountered in the circuit and the energy wasted will be negligible.

I claim:

1. A single hydraulic control device for a self propelled lifting truck such as a fork lift truck having hydraulically power operated steering means, hydraulically operated mast tilt means and hydraulically operated means for raising and lowering the load carrying forks on the mast, the hydraulic control device comprising a hydraulic fluid reservoir, a fluid supply line from the reservoir to a first circuit incorporating the hydraulic power assisted steering means, a fluid flow restrictor in said first circuit to said steering means, a relief valve between said restrictor and said hydraulically power operated steering means downstream of said restrictor to maintain a predetermined pressure in said steering means, a second fluid supply line supplied by fluid from said restrictor and incorporating said hydraulically operating mast tilt means, and said hydraulically operated fork raising and lowering means through separate valve means, a pump for pumping fluid around circuits connected to both of said supply lines, a prime mover drivingly connected to said pump, and a control unit responsive to fluid pressure in said mast tilt and fork raising and lowering means to vary the pump output to maintain a substantially constant fluid pressure to said steering means and to supply fluid from said restrictor to said hydraulically actuated mast tilt means and fork raising and lowering means in response to signals from said control unit.

2. A hydraulic control circuit according to claim 1, wherein an electric motor drive is provided for the pump and the control unit is operable to vary the output of the pump by varying the speed of the electric motor.

3. A hydraulic control circuit according to claim 1, wherein the valve means comprise slide valves for the lifting and tilting cylinders respectively, and movement of the said slide valves operates switch means connected to the control unit.

4. A hydraulic control circuit according to claim 2, wherein the control unit includes a trimming control operable to pre-set the speed of the motor at the various speed levels.

5. A hydraulic control circuit according to claim 1, including means operated by the vehicle parking brake operable to stop and start the pump through the control unit.

* * * * *